US 6,433,660 B1

(12) United States Patent
Saravolac

(10) Patent No.: US 6,433,660 B1
(45) Date of Patent: Aug. 13, 2002

(54) RESISTIVE SUPERCONDUCTING CURRENT LIMITER

(75) Inventor: Milan Saravolac, Edinburgh (GB)

(73) Assignee: Va Tech T & D NL BV (NL)

( * ) Notice: Subject to any disclaimer, the term of this patent is extended or adjusted under 35 U.S.C. 154(b) by 0 days.

(21) Appl. No.: 09/626,961

(22) Filed: Jul. 27, 2000

Related U.S. Application Data

(63) Continuation of application No. 09/037,737, filed on Mar. 10, 1998, now Pat. No. 6,137,388.

(30) Foreign Application Priority Data

Mar. 19, 1997 (GB) .............................................. 9705717

(51) Int. Cl.⁷ .............................. H01F 6/00; H01F 7/00; H01F 1/00
(52) U.S. Cl. .......................................... 335/216; 505/1
(58) Field of Search .......................... 335/216, 229–30; 505/1, 850; 324/318–321

(56) References Cited

U.S. PATENT DOCUMENTS 4,918,409 A * 4/1990 Lamberty .................... 333/1.1
6,137,388 A * 10/2000 Saravolac ................... 335/216

FOREIGN PATENT DOCUMENTS

FR 2704367 A 4/1993
GB 2225164 A 5/1990

* cited by examiner

*Primary Examiner*—Lincoln Donovan
*Assistant Examiner*—Tuyen T. Nguyen
(74) *Attorney, Agent, or Firm*—W. Warren Taltavull; Manelli Denison & Selter PLLC

(57) ABSTRACT

A superconductor is placed inside a non-metallic cryostat filled with a cooling medium to maintain the superconductor in a superconductive state. A foil winding is connected in series with the superconductor by current leads and the cryostat is placed inside the winding. The winding has only a few turns in order to provide low inductance and low magnetic field when the superconductor is carrying its normal operating current. However in the event of a fault the increase in electrical current in the line winding causes a magnetic field to be generated parallel to the superconductor. The magnetic field generated exceeds the critical magnetic field of the superconductor. The magnetic field produced by the line winding triggers the superconductor to the resistive state.

10 Claims, 1 Drawing Sheet

RESISTIVE SUPERCONDUCTING CURRENT LIMITER

CROSS REFERENCE TO RELATED APPLICATION

This is a continuation of application Ser. No. 09/037,737, filed Mar. 10, 1998, now U.S. Pat. No. 6,137,388 granted Oct. 24, 2000.

FIELD OF THE INVENTION

The present invention relates to a current limiter and in particular to a resistive superconducting current limiter.

BACKGROUND OF THE INVENTION

Current limiters prevent unacceptable large current surges in high power systems during power fluctuations, lightning strikes and short circuits and thus protect expensive electrical equipment from damage. The need for current limiters is associated with the continuous growth and interconnection of modern power systems which results in a progressive increase of short circuits to levels far beyond the original design capacity of the switchgear.

Current limiters can be grouped as resistive, inductive or hybrid, which operate by changing their impedance from nearly zero during normal operations to a current limiting value during fault conditions. The ideal performance characteristics of a fault current limiter include; zero impedance under normal operating conditions, high impedance under fault limiting conditions, fast transition from normal to fault limiting conditions, fast recovery to normal protection after interruption of a fault, high reliability over long periods with minimal maintenance, low volume, low weight and low cost.

Superconductors, high temperature (HTC) or low temperature (LTC), offer attractive potential as fault current limiters due to the great contrast between the superconducting and non-superconducting states.

The application of low temperature metallic superconductors to power engineering is limited by their low operational temperature which required liquid helium refrigeration for large scale devices. The cryogenic engineering of liquid helium is sophisticated, costly and demands specialised technical support.

In contrast high temperature ceramic superconductors remain superconducting at transition temperatures above 77 K, which is the saturation temperature of liquid nitrogen at one atmosphere. The low cost, reliability and simplicity of refrigeration at liquid nitrogen temperatures makes high temperature superconducting materials very attractive to the power engineering industry.

High temperature superconductors are however inhomogenous, anistropic and brittle materials. Their use as fault current limiter encounters problems of local heating and mechanical failure when a fault current is applied.

Resistive superconducting fault current limiters incorporate a superconducting element connected in series with the system to be protected. When the system is carrying normal operating current the element is in the superconducting state and thus has near zero resistance. The element is driven to the resistive state when a system fault occurs. The increase in current exceeds the critical current of the superconducting material which quenches to a resistive state. The impedance of the device (which is predominately resistive) increases rapidly providing the fault limiting effect.

A problem with resistive superconducting fault limiters occurs if part of the superconducting element becomes resistive before the rest of the element. This is known as "local quenching" and is due to a non-uniformity of superconducting properties along the element length. The quenched part of the superconducting element overheats and may burn out leading to a catastrophic failure.

To avoid the problem of local quenching it is known to use triggering techniques to obtain a fast and uniform transition of the superconductor to the resistive state. Known triggering techniques include laser heating to exceed the critical temperature of the superconductor, discharging capacitors to exceed the critical current density of the superconductor and external sources of magnetic field to exceed the critical flux density of the superconductor. The triggering technique has to respond within a few milliseconds in order to limit the current before it reaches its peak value and must provide sufficient energy to quench the whole of the superconductor.

British patent number 1,236,082 discloses a resistive superconducting fault current limiter which uses a low temperature metallic superconductor. In this patent a magnetic field produced by a helmholtz coil is used to quench the low temperature superconductor. A problem with this fault current limiter is that the magnetic field is radial and introduces an external Lorentz force on the superconducting elements. This arrangement is therefore unsuitable for use with high temperature superconductors as the Lorentz forces generated by the radial field would cause mechanical failure of the brittle high temperature superconductor elements.

SUMMARY OF THE INVENTION

The present invention seeks to provide a triggering technique suitable for use with high temperature superconductors. A fault current limiter in accordance with the present invention solves the problem of local heating and mechanical fracture failure in superconductive elements.

High temperature superconductors offer an attractive cost effective design due to the reduced cooling costs compared to low temperature metallic superconductors. The superconductive fault current limiter in accordance with the present invention has flexible design features to satisfy operating specifications by easily varying the physical, electrical and magnetic parameters. Uniform quenching of the superconductor is achieved by the combination of the critical current density and critical magnetic field intensity. The design has the advantage of being light weight, compact, high impedance ratio and can be easily upgraded to a higher rating fault current limiter.

According to the present invention a resistive superconductive current limiter comprises a superconducting element maintained in a superconducting state when carrying an electrical current under normal operating conditions, and means for generating a magnetic field parallel to the superconducting element so that when a fault occurs the increase in the electrical current through the means for generating the magnetic field causes the magnetic field to be generated parallel to the superconducting element, the magnetic field generated exceeds the critical magnetic field density of the superconducting element to assist triggering of the transition of the superconducting element to a resistive state.

The application of a magnetic field parallel to the superconducting elements offers the advantage that no external forces are introduced. Mechanical failure of the superconducting elements does not therefore occur.

Preferably the magnetic field is uniform which prevents local quenching which can cause thermal and mechanical failures due to local heating in high temperature superconductors. The application of a uniform magnetic field is also used to increase the rate of change of resistance of the superconductor, which in effect helps to produce a fast response fault current limiter.

The uniform magnetic field parallel to the superconductor is generated by a winding through which an electrical current passes and which is preferably connected in series with the superconducting element.

The winding is preferably a wound conductor foil of for example copper or aluminium. The winding is preferably connected in series with the superconducting element so that when a fault occurs the increase in electrical current through the winding causes a magnetic field to be generated which exceeds the critical magnetic field of the superconducting element.

Foil windings are simple to produce and self-supporting. The production of the foil windings can be automated to produce a cost effective fault current limiter system.

In the preferred embodiment of the present invention the superconducting element is located in a cryostat which is filled with a fluid at a temperature low enough to maintain it in the superconducting state. The cryostat is non-metallic and is placed within the winding.

The superconducting element may be a non-inductively arranged set of resistive elements.

Preferably means, such as a reactor or resistor, is connected in parallel with the fault current limiter to limit the transient overvoltage in the superconducting element when in the resistive state.

BRIEF DESCRIPTION OF THE DRAWINGS

The present invention will now be described with reference to FIG. 1 which shows a partially broken away view of a fault current limiter in accordance with the present invention.

DETAILED DESCRIPTION OF THE INVENTION

Figure 1:
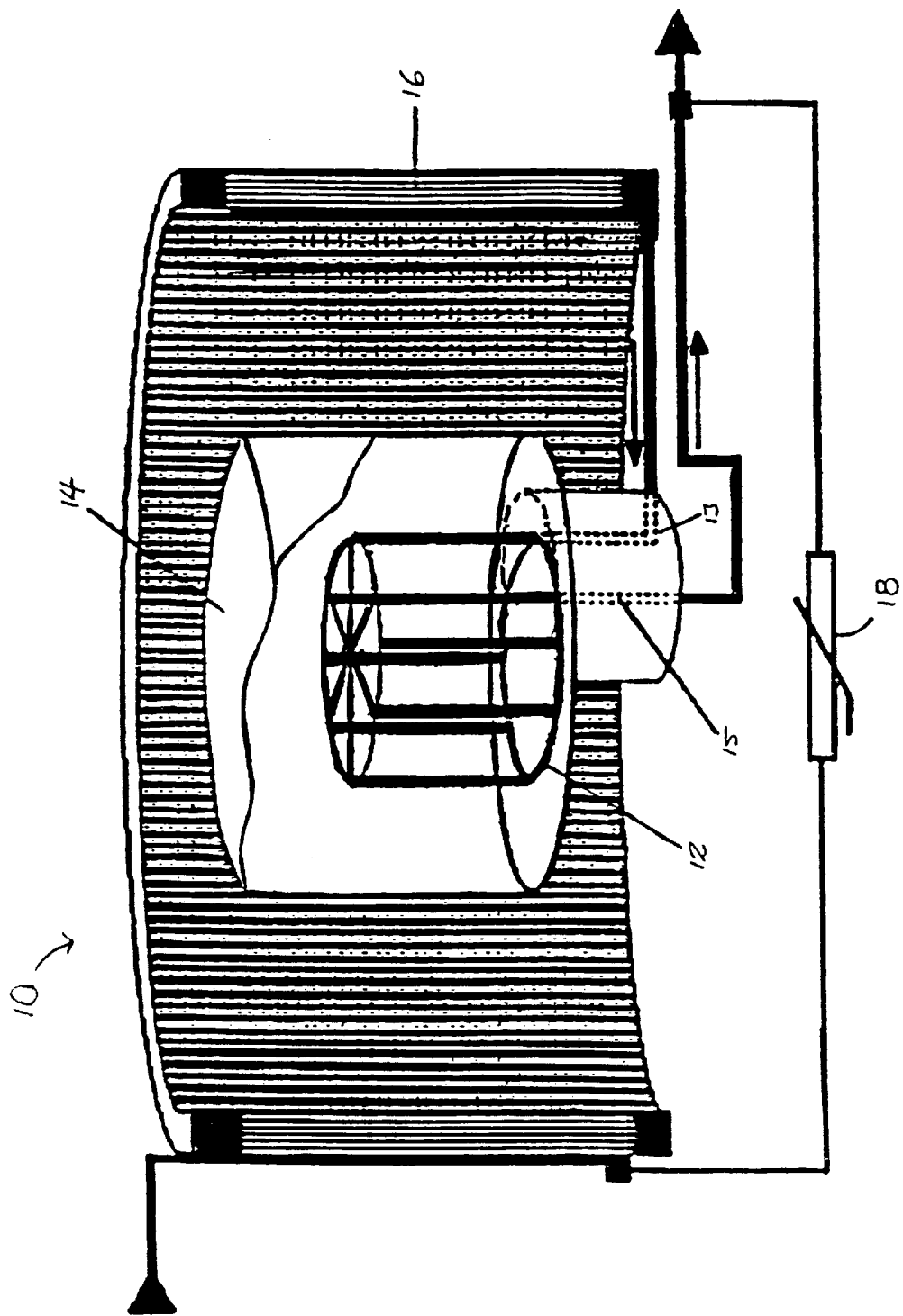

Referring to FIG. 1 a superconductive current limiter is generally indicated at 10. The superconducting element 12, consists of a non-inductively arranged (low self-field) resistor elements which are placed inside a non-metallic cryostat 14. The cryostat 14 is filled with a cooling medium such as liquid nitrogen which has a temperature low enough to maintain the superconducting element 12 in a superconductive state.

The cryostat 14 is placed inside a conventional line winding 16, a foil winding, connected in series with the superconducting element 12. The superconducting element 12 is connected to the foil winding 16 by means of current leads 13 and 15. The pair of vertical current leads 13 and 15, each carry current in the opposite direction and are located inside the winding 16 in the region of predominately uniform magnetic field.

The line winding 16 is a foil winding, of for example copper or aliminium, and provides a magnetic field parallel to the superconducting element 12. The magnetic field assists triggering and the number of turns in the foil winding 16 is selected to provide low inductance and low magnetic field when the superconducting element 12 is carrying its normal operating current.

In the event of a fault, such as a short circuit, the increase in electrical current in the foil winding 16 causes a magnetic field to be generated parallel to the superconducting element 12 which exceeds the critical magnetic field of the superconducting element 12. The magnetic field produced by the foil winding 16, in combination with the increased current in the superconducting elements, triggers the superconducting element 12 to the resistive state.

The magnetic field produced by the foil winding 16 is uniform and parallel to the superconducting element 12. It is used as a means of additional triggering and uniform quenching. Uniform quenching solves one of the acute problems of local quenching, which causes thermal and mechanical failures due to local heating in most high temperature superconductors used in power systems. The application of a uniform parallel field is also used to increase the rate of change of resistance of the superconducting elements 12, which in effect helps to produce a fast responding fault current limiter.

Since the introduction of a uniform and parallel magnetic field does not introduce an external force on the brittle superconducting elements 16, the overall mechanical design can be less costly. This invention uses a foil winding 16, which is simple to produce and self-supporting and the production of the foil windings 16 can be automated to produce a cost effective fault current limiter system.

A metal oxide varistor 18 is connected in parallel with the current limiter 10 in order to provide protection against the transient over-voltages and to assist in preventing excessive dissipation in the superconducting element 12.

A superconducting current limiter 10 in accordance with the present invention is light weight, compact, fast, has lower losses, has lower overall cost and the impedance ratio is superior to other designs. By arranging the superconducting element 12 in the non-inductive manner, the stored energy in the superconducting element 12 is greatly reduced. This means that power dissipation in the superconducting element 12 following a resistive transition is also greatly reduced.

The foil winding 16 generates the magnetic field automatically when a fault occurs due to the increase in current through the foil winding 16. When the magnetic flux density exceeds the critical value it assists a uniform and fast quenching of the superconducting element 12.

It will be appreciated by one skilled in the art that an alternative arrangement could be used in which the whole system, winding 16 and the superconducting elements 12, are placed inside the cryostat 14. In this arrangement however allowances for power losses in the winding 16, current leads 13 & 15 and the cryostat 14, if metallic, has to be made.

I claim:

1. A resistive superconducting current limiter comprising a superconducting element maintained in a superconducting state when carrying an electrical current under normal operating conditions, and means for generating a magnetic field parallel to the superconducting element, the means for generating the magnetic field being connected in series with the superconducting element so that when a fault occurs the increase in the electrical current through the means for generating the magnetic field causes a magnetic field to be generated parallel to the superconducting element which exceeds the critical magnetic field density of the superconducting element to assist triggering of the transition of the superconducting element to a resistive state.

2. A current limiter as claimed in claim 1 in which the magnetic field is uniform.

3. A current limiter as claimed in claim 1 in which the magnetic field is generated by a winding through which the electrical current passes.

4. A current limiter as claimed in claim 3 in which the winding is a wound conducting foil.

5. A current limiter as claimed in claim 1 in which the superconducting element is located in a cryostat which is filled with a fluid at a temperature low enough to maintain said element in the superconducting state.

6. A current limiter as claimed in claim 5 in which the cryostat is non-metallic.

7. A current limiter as claimed in claim 1 in which the superconducting element is a non-inductively arranged set of resistive elements.

8. A current limiter as claimed in claim 1 in which means is connected in parallel to limit the transient overvoltage in the superconducting element when in the resistive state.

9. A current limiter as claimed in claim 1 in which a reactor or resistor limits the transient overvoltage.

10. A resistive superconducting current limiter comprising a superconducting element maintained in a superconducting state when carrying an electrical current under normal operating conditions, and means for generating a magnetic field parallel to the superconducting element, the means for generating the magnetic field being connected in series with the superconducting element so that when a fault occurs the increase in the electrical current through the means for generating the magnetic field causes a magnetic field to be generated parallel to the superconducting element which exceeds the critical magnetic field density of the superconducting element to assist triggering of the transition of the superconducting element to a resistive state, said means for generating the magnetic field comprising a winding through which the electrical current passes and said winding comprising a wound conducting foil.

* * * * *